(No Model.)

W. F. McQUIVEY.
DEVICE FOR SECURING WHEELS TO AXLES.

No. 552,499. Patented Dec. 31, 1895.

WITNESSES:
Edward Thorpe
N. B. Hutchinson

INVENTOR
W. F. McQuivey
BY
Munn & Co
ATTORNEYS.

UNITED STATES PATENT OFFICE.

WILLIAM FREDERICK McQUIVEY, OF SEATTLE, WASHINGTON.

DEVICE FOR SECURING WHEELS TO AXLES.

SPECIFICATION forming part of Letters Patent No. 552,499, dated December 31, 1895.

Application filed February 1, 1895. Serial No. 537,009. (No model.)

*To all whom it may concern:*

Be it known that I, WILLIAM FREDERICK MCQUIVEY, of Seattle, in the county of King and State of Washington, have invented a new and Improved Device for Securing Wheels to Axles, of which the following is a full, clear, and exact description.

My invention relates to improvements in devices which are used to fasten a wheel to an axle; and the object of my invention is to produce a simple device which is particularly adapted to attach vehicle-wheels to their axles, which can be easily operated to attach or remove the wheel, which can be operated without the use of tools, which locks the hub so securely to its axle that it cannot be accidentally removed except by the breaking of the axle, which can be handled without soiling the hands or the clothing of the party handling it, and which adds neatness and beauty to the appearance of the wheel.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
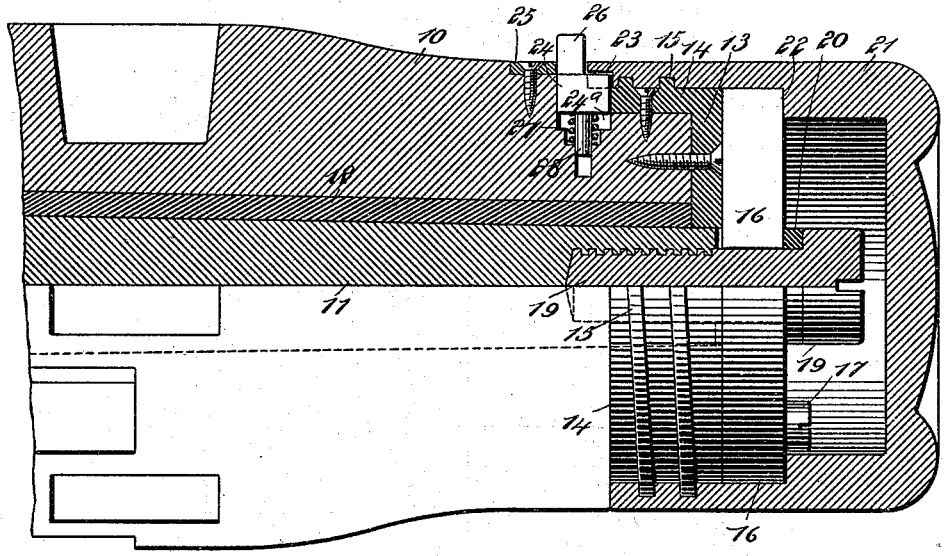
Figure 2:
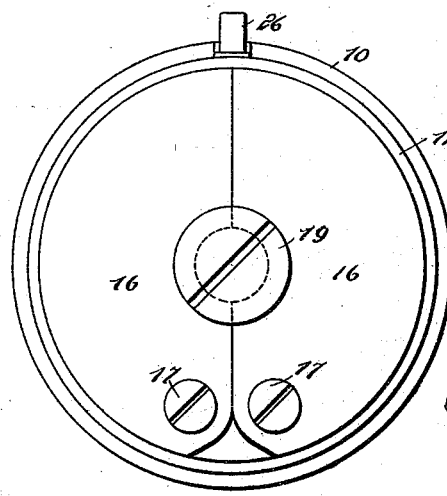
Figure 3:
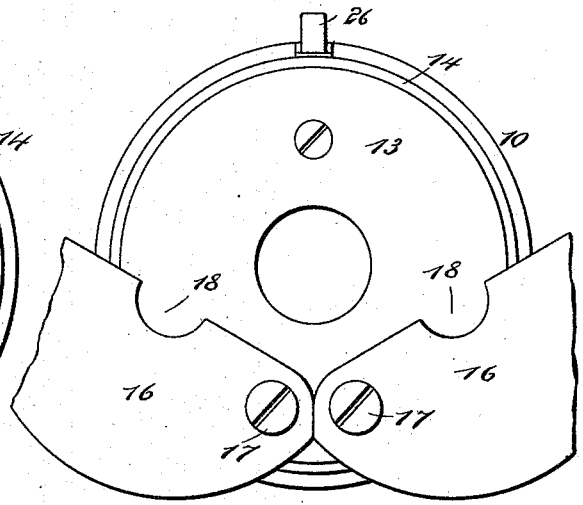

Figure 1 is a broken longitudinal section of my improved device as applied to a wheel-hub and axle. Fig. 2 is an end view of the hub with the screw-cap removed and with the locking-plates closed, and Fig. 3 is an end view of the hub with the locking-plates open.

The hub 10 may be of any usual construction and it turns on the ordinary axle 11 and has the customary box 12. The hub is provided with an end plate 13, which fits around the end of the axle and which has a flange or band 14 overlapping the face of the hub, and this flange or band is provided with a coarse screw-thread 15 to engage the screw-cap, to be hereinafter described.

The hub is provided with a pair of oppositely-arranged locking-plates 16, which are practically semicircular and which at their lower ends are pivoted, as shown at 17, to the end plate 13 of the hub, and these locking-plates are provided with central recesses 18 to fit around the axle-screw 19, this being screwed into the end of the axle so as to project endwise therefrom, as shown clearly in Fig. 1, and between the head of this screw and the locking-plates a leather washer 20 is preferably placed.

The end of the hub is provided with a screw-cap 21, which is threaded to fit the thread 15 of the hub band or flange 14, and this cap is provided with a shoulder 22 to fit against the locking-plates 16, and as the diameter of the cap is such as to cause it to fit snugly over the locking-plates it will be seen that they are locked firmly around the screw 19.

The screw-cap would doubtless stay in place when screwed to position without any particular fastening device; but to provide against any possible disarrangement of the cap it is provided at its inner edge with a recess 23, which engages a catch 24, this being movable in and out in a recess $24^a$ in the hub 10, and the catch is held in a suitable guide-plate 25 and has a projecting thumb-piece 26, which may be pressed so as to push the catch inward when it is to be disengaged from the screw-cap 21. The catch 24 is pushed outward by a spiral spring 27 behind it, which is coiled around a guide-shank 28 on the inner end of the catch. It is obvious that many other forms of fastening devices might be used in connection with the screw-cap without departing from the principle of the invention.

It will be readily seen that this fastening device may be applied to wheels and axles of many kinds, and that when applied the wheel-hub is locked securely to the axle and can be easily removed by simply unscrewing the cap 21 and opening the locking-plates 16, so that the axle may be oiled much easier than where the ordinary nut is used to fasten the hub to the axle.

Having thus described my invention, I claim as new and desire to secure by Letters Patent—

1. The combination with the axle, and wheel hub, of the screw in the axle end, the locking plates pivoted on the wheel hub and adapted to close over the axle screw, and a fastening cap secured to the hub and engaging the outer faces of the locking plates to hold them closed, substantially as described.

2. The combination with the axle, and the wheel hub, of the screw in the end of the axle, the locking plates pivoted on the hub and adapted to close around the screw, and a screw cap to fit the end of the hub and provided with a shoulder engaging the outer faces of the locking plates, substantially as described.

3. The combination with the wheel hub, and axle, of the axle screw in the end of the axle, the locking plates pivoted on the hub end and adapted to close around the screw, the screw cap to fit the end of the hub and provided with a shoulder engaging the locking plates, and a fastening catch to lock the screw cap in place, substantially as described.

4. The combination with a hub provided with a flange or band overlapping the face of the hub, said band being screw threaded, the axle, and a screw projecting from the end of the axle, of locking plates pivoted to the flange or band of the hub and closing around the screw, a threaded cap provided with an internal shoulder engaging the locking plates and a spring catch in the hub and engaging the cap, substantially as described.

5. The combination, with the hub, the axle, the axle screw and the pivoted locking plates, of the screw cap to fit the end of the hub, the cap having a recess at its inner end, and the spring catch held in the hub to engage the recess of the cap, substantially as described.

WILLIAM FREDERICK McQUIVEY.

Witnesses:
BOYD J. TALLMAN,
WANDA MERTENS.